US006362849B1

(12) United States Patent
Caisey-Bluteau et al.

(10) Patent No.: US 6,362,849 B1
(45) Date of Patent: Mar. 26, 2002

(54) COLOR MEASURING METHOD AND DEVICE

(75) Inventors: Laurence Caisey-Bluteau, Cormeilles en Parisis; Johan Aubert, Clichy, both of (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/000,345

(22) PCT Filed: May 23, 1997

(86) PCT No.: PCT/FR97/00911

§ 371 Date: Mar. 24, 1998

§ 102(e) Date: Mar. 24, 1998

(87) PCT Pub. No.: WO97/44642

PCT Pub. Date: Nov. 27, 1997

(30) Foreign Application Priority Data

May 23, 1996 (FR) ............................................. 96 06425

(51) Int. Cl.$^7$ ........................... H04N 5/228; G03F 3/08; G06K 9/00
(52) U.S. Cl. ........................ 348/222; 358/518; 382/162
(58) Field of Search ................................ 382/162, 167; 358/518; 348/222, 272, 182, 181, 180, 187, 188, 93

(56) References Cited

U.S. PATENT DOCUMENTS

| | | | | |
|---|---|---|---|---|
| 4,985,853 A | * | 1/1991 | Taylor et al. | ................ 358/518 |
| 5,177,694 A | | 1/1993 | Graham et al. | |
| 5,323,249 A | * | 6/1994 | Liang | ........................ 358/518 |
| 4,495,429 A | | 2/1996 | Craven et al. | |
| 5,495,429 A | | 2/1996 | Craven et al. | |
| 5,668,596 A | * | 9/1997 | Vogel | ........................ 348/222 |
| 5,724,259 A | | 3/1998 | Seymour et al. | |
| 5,793,879 A | | 8/1998 | Benn et al. | |
| 5,850,472 A | * | 12/1998 | Alston et al. | ................ 382/162 |
| 5,852,675 A | | 12/1998 | Matsuo et al. | |
| 5,900,932 A | * | 5/1999 | Beretta | ........................ 356/328 |
| 6,008,905 A | | 12/1999 | Breton et al. | |
| 6,081,254 A | * | 6/2000 | Tanaka et al. | ............... 358/518 |

FOREIGN PATENT DOCUMENTS

| | | |
|---|---|---|
| EP | 560 170 | 9/1993 |
| EP | A-560 170 | 9/1993 |
| EP | 562 745 | 9/1993 |
| EP | A-562 745 | 9/1993 |
| WO | WO 87/03470 | 6/1987 |
| WO | WO 90/00733 | 1/1990 |
| WO | WO 96/05489 | 2/1996 |

OTHER PUBLICATIONS

Simpson M. L. et al., "Imaging Colorimetry: A New Approach", Applied Optics, vol. 30, No. 32, pp. 4666–4671, Nov. 1991.

Peyruca J–F:, "La Mesure Des Couleurs" Mesures Regulation Automatisme, No. 666, pp. 127–132, Jun., 1994.

\* cited by examiner

*Primary Examiner*—Wendy R. Garber
*Assistant Examiner*—Rashawn N. Tillery
(74) *Attorney, Agent, or Firm*—Oliff & Berridge PLC (57) ABSTRACT

The invention relates to apparatus for measuring color, the apparatus comprising: an acquisition system including a video camera and processing means organized to respond to the signals delivered by the camera to determine the tristimulus values of the color of the object in a reference colorimetric system by using a transfer matrix to transform the colorimetric system associated with said acquisition system into the reference colorimetric system, and to determine a correction function Γ to correct the non-linearities of said acquisition system.

18 Claims, 5 Drawing Sheets

FIG_3

FIG_4

FIG_7

FIG_8

FIG_9  FIG_10

COLOR MEASURING METHOD AND DEVICE

The present invention relates to apparatus and to a method for measuring color.

BACKGROUND OF THE INVENTION

To measure the color of an opaque object, it is known to use a colorimeter comprising a light source for illuminating the object, optical analyzer apparatus for analyzing the light reflected by the object, and calculation means responsive to the signals delivered by the optical analyzer apparatus to determine the tristimulus values X, Y, and Z of the color of the object in a reference colorimetry system, for example the system adopted in 1931 by the International Commission on Illumination (CIE).

The optical analyzer apparatus includes means for splitting the light reflected by the object into three beams, each of which passes through a filter system and terminates on an associated photoelectric cell.

That type of known calorimeter suffers from the drawback of requiring direct contact between the optical analyzer apparatus and the object whose color is to be measured, and of being unsuited to measuring the color of an object remotely or to measuring the color of an object that is not opaque, that diffuses or absorbs light while also passing a portion thereof, such as the skin or certain plastics or kinds of makeup.

To mitigate those drawbacks, attempts have been made to measure color by means of a video camera.

Nevertheless, so far as the Applicant company is aware, there still does not exist any apparatus which is suitable for remotely measuring the color of an object, in particular an object that is not opaque, and which is capable of measuring color accurately, reliably, and quickly while nevertheless being of relatively low price.

OBJECTS AND SUMMARY OF THE INVENTION

A particular object of the present invention is to provide novel apparatus for measuring the color of any type of object, using a video camera, and making it possible to measure color accurately, reliably, and quickly while being of relatively low cost and easy to use.

The invention achieves this by means of an apparatus for measuring color, comprising:

an acquisition system including a video camera, said acquisition system being suitable for delivering signals representative of the tristimulus values in a colorimetric system associated with said acquisition system for the color of an object placed in the observation field of the camera; and processor means organized to respond to said signals to determine the tristimulus values of the color of the object in a reference colorimetric system using a transfer matrix to transform from the colorimetric system associated with said acquisition system into the reference colorimetric system, and a correction function for correcting the non-linearities of said acquisition system, said transfer matrix and said correction function being calculated using an iterative process based on the known tristimulus values in the reference colorimetric system of three primary colors and of at least two gray levels and from their tristimulus values in the colorimetric system associated with said acquisition system, as obtained by using said video camera to observe said primary colors and said gray levels.

In a preferred embodiment of the invention, the apparatus further includes a display system for reproducing all or a portion of the image observed by said video camera after said signals delivered by the acquisition system have been processed by said correction function.

Preferably, said display system includes a cathode ray tube (CRT) display device.

Advantageously, the apparatus further comprises a light source for illuminating the object placed in the field of observation of the camera, said source having a continuous emission spectrum $I(\lambda)$ selected so as to be close to a reference illuminant of spectrum $D(\lambda)$.

The camera includes a set of optical filters of spectra $FR(\lambda)$, $FG(\lambda)$, and $FB(\lambda)$ to resolve the image observed by the camera into primary color images on the sensors of said camera, advantageously the source is filtered by one or more filters for which the resultant filter function $F(\lambda)$ is selected so as to minimize the error of differences between the products $D(\lambda) \cdot x(\lambda)$, $D(\lambda) \cdot y(\lambda)$, and $D(\lambda) \cdot z(\lambda)$, and a linear combination of the products:

$F(\lambda) \cdot I(\lambda)$, $FR(\lambda) \cdot F(\lambda) I(\lambda) \cdot FG(\lambda)$, and $F(\lambda) \cdot I(\lambda) \cdot FB(\lambda)$ where $x(\lambda)$, $y(\lambda)$, and $z(\lambda)$ are the spectral tristimulus values in the reference colorimetric system.

Preferably, said reference illuminant is the CIE illuminant of spectral $D_{65}(\lambda)$.

The invention also provides a method of measuring the color of an object from an acquisition system including a video camera suitable for delivering signals representative of the tristimulus values, in a colorimetric system associated with the said acquisition system, of the color of an object placed in the field of observation of the camera, the method comprising the steps consisting in:

successively or simultaneously placing in the field of observation of the camera three primary colors and at least two gray levels, the tristimulus values of said primary colors and of said gray levels being known in a reference colorimetric system;

using an iterative process based on said tristimulus values in said reference colorimetric system and the corresponding tristimulus values in the colorimetric system associated with said acquisition system as obtained by observing said primary colors and said gray levels using said camera to calculate a transfer matrix for transforming from the colorimetric system associated with said acquisition system into the reference colorimetric system, and also a correction function for correcting the non-linearities of said acquisition system; and determining the tristimulus values in the reference colorimetric system of the color of an object placed in the field of observation of the camera by using said transfer matrix and said correction function as calculated.

Advantageously, in the method, the color of the object is also viewed by means of a display system after the non-linearities of the acquisition system have been corrected.

Advantageously, in this method, the non-linearities of the display system are also corrected.

In a particular implementation of the method of the invention, the display system includes a CRT display device.

In a particular implementation of the method of the invention, a function for correcting the non-linearities of the display system is determined by:

displaying two zones having the same color but with luminances that may be different, the color of one of the zones being obtained by juxtaposing pixels having distinct control levels and the color of the other zone being obtained by a set of pixels all having the same control level corresponding to the mean of the control levels of the pixels of the other zone; and making the luminances of the two zones equal for an observer by acting on pixel control level in one of the zones.

From the values of the pixel control levels in each of said zones before and after luminance equalization, information is deduced for calculating said correction function for correcting the non-linearities of the display system.

Preferably, one of the zones is rasterized.

Advantageously, said rasterized zone has every other raster line black.

When the display system includes a CRT display device and at a control level transition for pixels in the same raster line giving rise to a change in luminance between at least one pixel in said raster line and the pixel immediately following it, in the raster scanning direction, the control level for said immediately following pixel is advantageously selected as a function of the rate at which the control signal for the electron beam reaching pixels situated on the same raster line varies when the pixel control level varies.

To determine the correction to be made to take account of the rate at which the signal controlling the electron beam reaching pixels situated on the same raster line varies, it is advantageous to proceed as follows.

Two zones of the same color but of luminances that may be different are displayed, the color of one of the zones being obtained by juxtaposing on the same raster line pixels of different control levels, and the color of the other zone being obtained by a set of pixels all having the same control level, then the luminances of the two zones are made equal for an observer by acting on pixel luminance control level in one of the zones.

From the values of the pixel luminance control levels in each of said zones before and after equalization, information is deduced for calculating the correction to be provided in order to take into account the rate at which the control signal for the electron beam reaching the pixels situated in the same raster line varies when the pixel control level varies.

Preferably, the zone formed by juxtaposing pixels of different luminances comprises, in the scan direction, alternating pixels each of luminance set to a level different from that of the preceding pixel.

The invention also provides a method of correcting the response of a display device having raster lines of pixels, in which, at a transition in the control level for pixels in the same raster line that gives rise to a variation of luminance at least between a pixel of said raster line and the pixel immediately following it in the raster scanning direction, the control level of said immediately following pixel is selected as a function of the rate at which the luminance of pixels situated on the same raster line varies when the control level of said pixels varies.

Advantageously, a correction function is determined for correcting the non-linearities of said display device by:

displaying two zones having the same color but luminances that may be different, the color of one of said zones being obtained by juxtaposing pixels having different control levels, while the color of the other zone is obtained by a set of pixels all having the same control level;

making the luminances of the two zones equal for an observer by acting on the pixel control levels of one of the zones; and from the values of the pixel control levels of each of said zones, deducing information for calculating said correction function for correcting the non-linearities of the display device.

In a particular implementation of this method, said zone made up of pixels having different control levels is rasterized.

Advantageously, said rasterized zone includes raster lines in which every other raster line is black.

In another particular implementation of the method, said zone made up of pixels having different control levels includes alternating pixels in each raster line having a control level that is different from the control level of the preceding pixel in said raster line.

Also, in a particular implementation of the method of the invention, the above-mentioned iterative process comprises the steps consisting in:

calculating an approximate transfer matrix on the basis of the known tristimulus values of said primary colors and of said gray levels, and on the basis of an approximate correction function;

calculating a new approximate correction function using the approximate transfer matrix calculated in this way and the known tristimulus values of said gray levels, and by interpolating the missing values; and recalculating the approximate transfer matrix and the approximate correction function until a fixed convergence threshold is reached.

In a variant, the iterative process comprises the steps consisting in:

calculating an approximate correction function on the basis of the known tristimulus values of said primary colors and of said gray levels, and on the basis of an approximate transfer matrix;

calculating a new approximate transfer matrix using the known tristimulus values of said grays and interpolating the missing values; and recalculating the approximate correction function and the approximate transfer matrix until a fixed convergence threshold is reached.

Advantageously, non-uniformities in the illumination of the object by the source are also corrected, as are optical aberrations of the camera, by measuring the luminance of the screen at various points and by comparing it with the luminance at a reference point, e.g. the center of the image.

BRIEF DESCRIPTION OF THE DRAWINGS

The invention will be better understood on reading the following detailed description of a non-limiting embodiment of the invention, and on examining the accompanying drawings, in which.

MORE DETAILED DESCRIPTION

Figure 1:
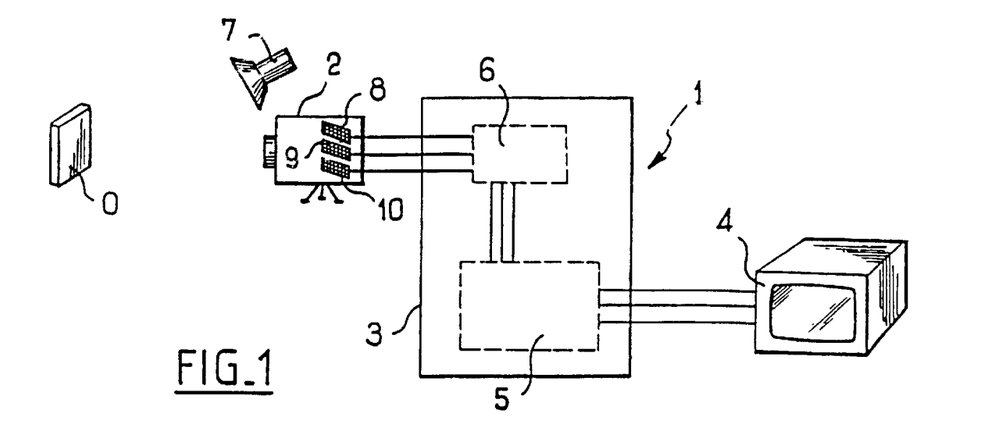
FIG. 1 is a diagrammatic view of color measuring apparatus constituting an embodiment of the invention.

FIG. 1 shows apparatus constituting a non-limiting embodiment of the invention and enabling the color of an object O to be measured remotely.

The apparatus 1 comprises a video camera 2, a microcomputer 3, and a cathode ray tube (CRT) display device 4.

The camera 2 has three CCD type sensors 8, 9, and 10 suitable for delivering respective analog electric signals $V_R$, $V_G$, and $V_B$, representative of red, green, and blue levels at each point of the image observed and scanned by the camera 2, in conventional manner.

A light source 7 serves to illuminate the object O placed in the field of the camera 2. Advantageously, a xenon light source is used which comes close to the $D_{65}(\lambda)$ spectrum as defined by the CIE.

The microprocessor 3 includes a central processor unit 5 and a three-channel analog-to-digital converter 6 connected to the central unit 5 and enabling the analog signals $V_R$, $V_G$, and $V_B$ delivered by the camera 2 to be converted into digital form.

The signals converted into digital form and respectively referenced R, G, and B are then applied to the central unit 5.

In the particular example described, each of the signals R, G, and B is encoded on 8 bits, and the data acquired by the camera at each image point is constituted by a triplet (R, G, B) of three integers each lying in the range 0 to 255.

Naturally, it would not go beyond the ambit of the invention to encode the signals on some other number of bits.

Figure 2:
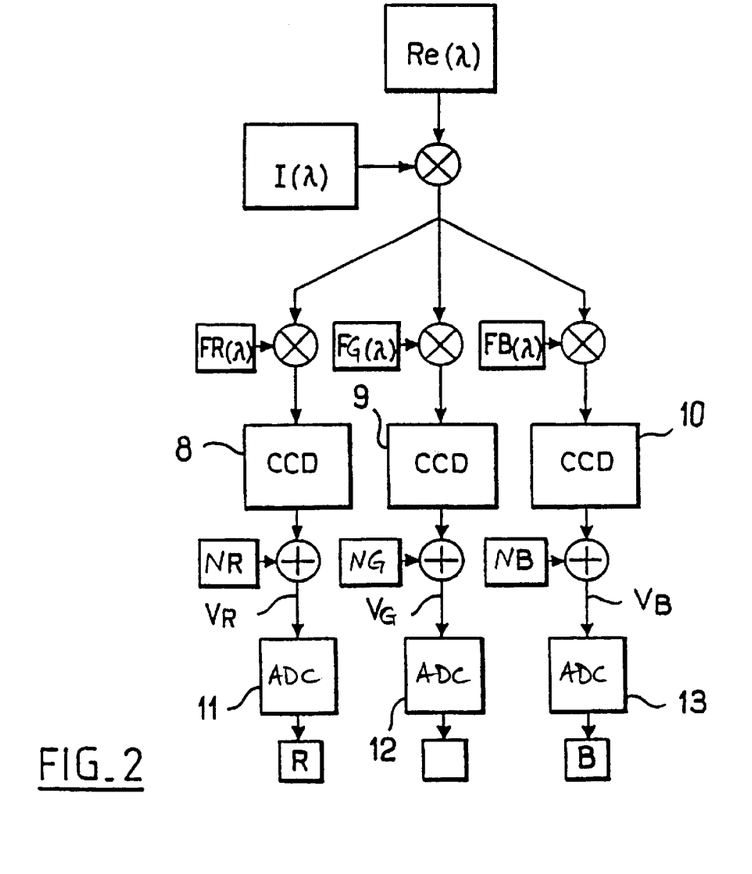
FIG. 2 is a model of the acquisition system.

The camera 1 and the converter 6 constitute an acquisition system which is modeled in FIG. 2.

The light spectrum reflected from each point of the object O and observed by the camera is the product of the spectrum of the light source $I(\lambda)$ multiplied by the reflectance spectrum $Re(\lambda)$ at said point.

The optical system of the camera 2 has three optical filters of respective spectra $FR(\lambda)$, $FG(\lambda)$, and $FB(\lambda)$ to resolve the image observed by the camera onto the CCD sensors 8, 9, and 10 in the form of images in the primary colors red, green, and blue.

The electronic components of the acquisition system contribute noise that can be resolved into an AC component and a DC component, with the noise in each of the channels being written NR, NG, and NB.

The high and low digitizing levels for each of the channels 11, 12, and 13 in the converter 6 are adjustable.

The low digitizing level in each channel is adjusted so as to eliminate the DC component of the noise, and the procedure is to ensure the lens cap is in place on the camera and then increase progressively the low digitizing level until the darkest zone of the image corresponds to the converter outputting a digital signal equal to unity on each channel.

The high digitizing level is adjusted by placing the brightest object liable to be observed in the field of observation of the camera.

It is advantageous to use a white surface.

The high digitizing level is adjusted until the brightest observed zone on the image corresponds to each channel of the example described outputting the maximum value of its digital signal minus unity, i.e. outputting the value 254.

If necessary, the brightness of the source 7 is reduced if the high level cannot be adjusted in the above manner.

AC noise can be attenuated by averaging a plurality of successive acquisitions of the same image.

The digital signals (R, G, B) delivered by the converter 6 are processed in the central unit 5 to determine, at each point of the image observed by the camera 2, the tristimulus values in a reference colorimetry system, such as the XYZ colorimetry system of the CIE. This processing corrects the non-linearities in the acquisition system, i.e. essentially the non-linearities of the CCD sensors 8, 9, and 10, and also the non-linearities of the converter 6. This processing also advantageously corrects non-uniformity of illumination of the object O by the source 7, and optical aberrations of the camera 2.

Naturally, it would not go beyond the ambit of the invention to select a reference colorimetry system other than the XYZ colorimetry system of the CIE.

Figure 3:
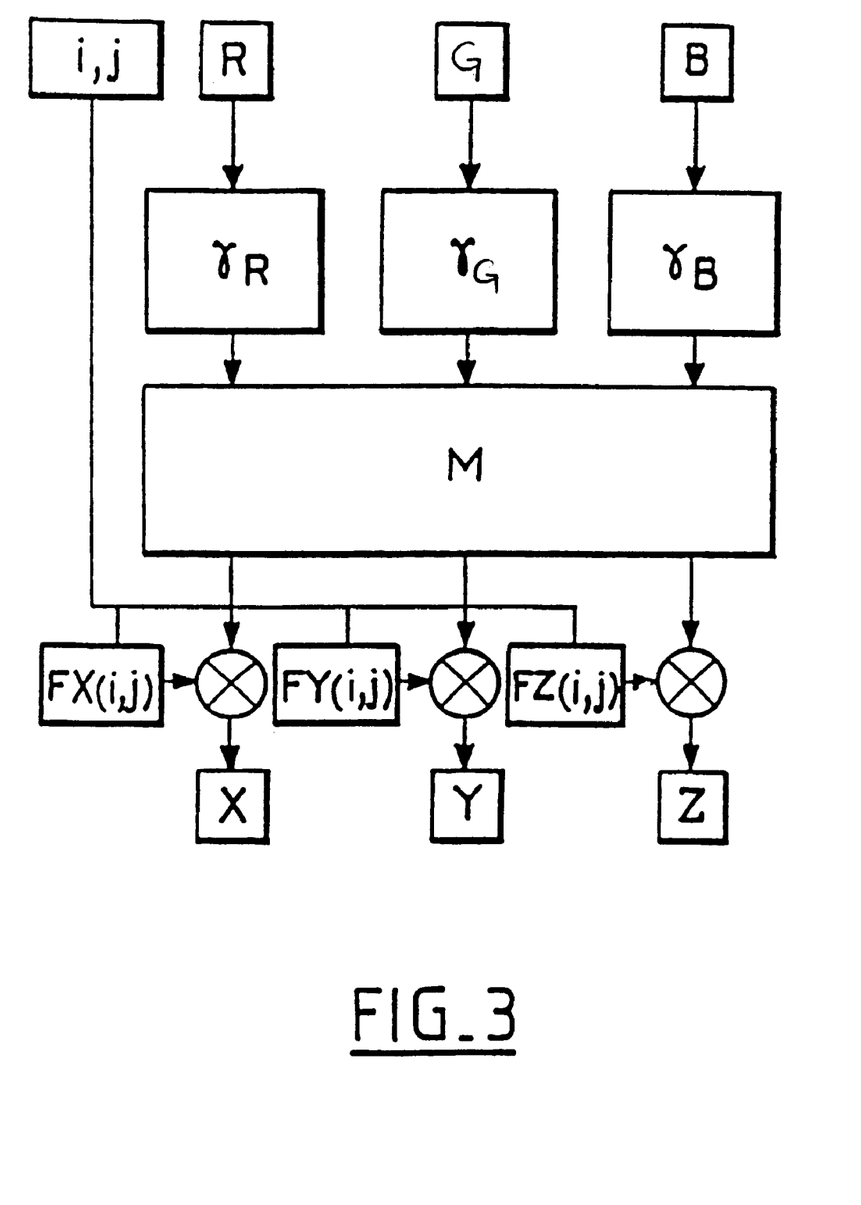
FIG. 3 is a model of the processing that enables the tristimulus values in the reference colorimetry system to be determined.

FIG. 3 models the processing performed by the central unit 5.

$Y_R$, $Y_G$, and $Y_B$ designate the components of the function Y for correcting the non-linearities of the CCD sensors 8, 9, and 10 and of the converter 6 in each of the red, green, and blue channels.

The transfer function for transforming the colorimetric system associated with the acquisition system into the reference colorimetric system can be written in the form of a matrix M.

X, Y, and Z represent the tristimulus values in the reference colorimetric system.

FX(i,j), FY(i,j), and FZ(i,j) designate the functions for correcting non-uniformity in the illumination of the object by the source 7, and for correcting optical aberrations of the camera 2, as a function of the coordinates (i,j) of each point under consideration in the image.

Figure 4:
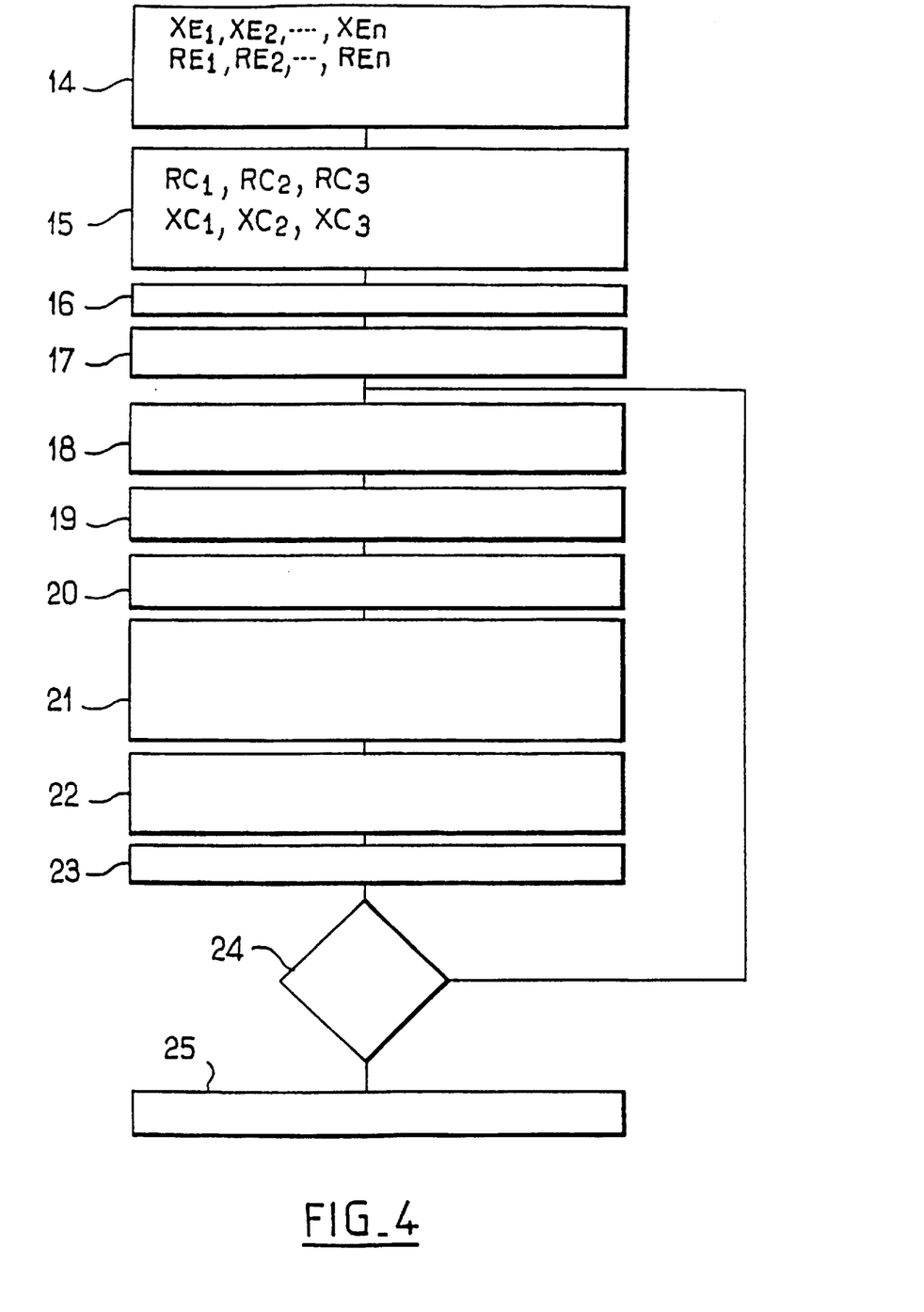
FIG. 4 is a flow chart showing the iterative process for calculating the transfer matrix and a correction function for correcting the non-linearities of the acquisition system.

The coefficients of the matrix M and the components $Y_R$, $Y_G$, and $Y_B$ are calculated in the manner described below with reference to the algorithm shown in FIG. 4.

Initially, in step 14, a first data set is acquired for use in the subsequent processing, by placing successively or simultaneously in the field of observation of the camera n colorimetric samples corresponding to different gray levels with known tristimulus values (X, Y, Z) in the reference colorimetric system XYZ.

Then, in the next step 15, three colorimetric samples corresponding to three primary colors with known tristimulus values in the reference colorimetric system are placed successively or simultaneously in the field of view to acquire a second data set for subsequent use in the processing. The tristimulus values in the reference colorimetry system can be measured using a spectrophotometer.

By way of example, the primary colors can be red, green, and blue, or magenta, cyan, and yellow. In general, they can be any colors providing they form a base in the reference colorimetric system.

The primary colors are preferably selected in such a manner that the triangle they form in the plane of the chromatic diagram for the reference colorimetric system encompasses all of the colors that are to be measured.

The colorimetric samples used are preferably opaque and of uniform color, and therefore measurable using a conventional calorimeter or spectrophotometer.

The various grays and primary colors are preferably measured in the center of the observation field of the camera 2 over an area that is sufficiently small, preferably constituting only about 10% of the total area covered by the field of observation of the camera, and which can be considered as being illuminated in uniform manner by the source 7.

Preferably, in order to acquire the various grays and primary colors, the positions of the source 7 and of the camera 2 relative to the samples, and also the type of lighting used, are as close as possible to the measurement configuration used by the colorimeter or spectrophotometer for determining the tristimulus values of the colors of the colorimetric samples used in the reference colorimetric system.

In step 14, the acquisition system delivers signals representative of the tristimulus values of n gray levels in the form of triplets of values which are written, in simplified manner: $RE_1, RE_2, \ldots, RE_n$, and the corresponding triplets in the reference colorimetric system are respectively written, likewise in simplified manner, as: $XE_1, XE_2, \ldots, XE_n$.

The notation $RE_i$ designates a triplet of values (R, G, B) and the notation $XE_i$ designates the corresponding triplet of values (X, Y, Z).

In step 15, the acquisition system delivers triplets of tristimulus values $RC_1$, $RC_2$, and $RC_3$, which triplets correspond in the reference colorimetric system to $XC_1$, $XC_2$, and $XC_3$, respectively, using the same type of notation as above.

In step 16, an iteration parameter k is initialized to the value 0, and in step 17, an approximate correction function $Y^k$ is initialized with components $Y_R^k$, $Y_G^k$, and $Y_B^k$, which function may vary on each iteration.

At iteration k=0, $Y_R^0$, $Y_G^0$, and $Y_B^0$ are selected to be equal to the identity function.

In step 18, for each iteration k, an approximate matrix $P^k$ is calculated for converting from the reference colometric system XYZ into the colorimetric system associated with the acquisition system by the formula:

$$P^k(Y^k)([RC_1 RC_2 RC_3])[XC_1 XC_2 XC_3]^{-2}$$

In step 19, the n values of the approximate correction function $Y^k$ are calculated using the formula:

$$Y^k(RE_i) = P_k XE_i \text{ for } i \text{ going from 1 to } n.$$

In step 20, the values missing from the correction function Y at iteration k are interpolated as follows.

For example, for the component $Y_R^k$:

if $Y_R^k(\omega_0)$ is known and if $Y_R^k(\omega_1)$ is known, then for $\omega_0 < \omega < \omega_1$, $Y_R^k(\omega)$ is determined by the following formula:

$$\log(Y_R^k(\omega)/255) = ((\omega-\omega_1)/(\omega_0-\omega_1)) \cdot \log(Y_R^k(\omega_0)/255) + ((\omega-\omega_0)/(\omega_0-\omega_1)) \cdot \log(Y_R^k(\omega_1)/255)$$

The same is applied to $Y_G^k$ and $Y_B^k$.

In step 21, the correction functions $Y_R^k$, $Y_G^k$, and $Y_B^k$ are normalized:

$$255 \cdot Y_R^k(\omega)/Y_R^k(255) \to Y_R^k(\omega)$$
$$255 \cdot Y_G^k(\omega)/Y_G^k(255) \to Y_G^k(\omega)$$
$$255 \cdot Y_B^k(\omega)/Y_B^k(255) \to Y_B^k(\omega)$$

for $\omega$ going from 1 to n.

In step 22, the error $e^k$ is calculated using the formula:

$$e^k (\Sigma((M^k Y^k(RC_i) - XC_i)^2)^{1/2}$$

for i going from 1 to n, with $Mk^k = (P^k)^{-1}$.

In step 23, the iteration parameter k is incremented.

In step 24, a test is made to see whether the error $e^k$ has converged.

If it has converged, the iterative process is stepped in step 25, otherwise the process returns to step 18 to calculate a new approximate transfer matrix $P^k$ and a new approximate function $Y^k$ for correcting non-linearities.

In step 25, the final transfer matrix M is calculated for transforming the colorimetric system associated with the acquisition system into the reference colorimetric system using the formula:

$$M = M^k = Y^k([XC_1 XC_2 XC_3])[RC_1 RC_2 RC_3]^{-1}$$

The transfer matrix M and the function Y for correcting non-linearities are thus calculated using an iterative method in which each iteration calculates an approximate transfer matrix and an approximate function for correction non-linearities.

Once the components $Y_R$, $Y_G$, and $Y_B$ of the function Y for calculating the transfer matrix M has been calculated, functions are determined for correcting non-uniformity in the illumination of the object O by the source 7, and for correcting the optical aberrations of the camera, i.e. the above-mentioned function FX(i,j), FY(i,j), and FZ(i,j) are calculated.

The functions FX(i,j), FY(i,j), and FZ(i,j) are calculated by acquiring the image of an object of uniform color that occupies the entire field of observation of the camera, and by determining the correction to be provided in such a manner that all of the image points have the same tristimulus values as the center of the image.

More precisely, in the example described, the tristimulus values for all of the points belonging to a measurement window are averaged, with said set of points being centered on a point having coordinates (i,j).

Mean values IMX(i,j), IMY(i,j), and IMZ(i,j) are thus obtained and the functions FX(i,j), FY(i,j), and FZ(i,j) are obtained by applying the following formulae:

$$FX(i,j) = IMX(i_{center}, j_{center})/IMX(i,j)$$

$$FY(i,j) = IMY(i_{center}, j_{center})/IMY(i,j)$$

$$FZ(i,j) = IMZ(i_{center}, j_{center})/IMZ(i,j)$$

where ($i_{center}$, $j_{center}$) are the coordinates of the center of the image.

Transforming from (R, G, B) coordinates to (X, Y, Z) coordinates as described above can impart a bias when the products $D_{65}(\lambda) \cdot x(\lambda)$, $D_{65}(\lambda) \cdot y(\lambda)$ and $D_{65}(\lambda) \cdot z(\lambda)$ are not linear combinations of the products $I(\lambda) \cdot FR(\lambda)$, $I(\lambda) \cdot FG(\lambda)$, and $I(\lambda) \cdot FB(\lambda)$, as is usually the case.

In order to reduce this bias, the source can advantageously be filtered with an optical filter F defined in such a manner as to minimize the error of differences between the products $D_{65}(\lambda) \cdot x(\lambda)$, $D_{65}(\lambda) \cdot y(\lambda)$, and $D_{65}(\lambda) \cdot z(\lambda)$ and a linear combination of the products $F(\lambda) \cdot I(\lambda) \cdot FR(\lambda)$, $F(\lambda) I(\lambda) \cdot FG(\lambda)$, and $F(\lambda) \cdot I(\lambda) \cdot FB(\lambda)$ Such a filter serves to optimize color measurement and is matched to the acquisition system.

It will be understood that the particular embodiment of the invention described above makes it possible to discover accurately the components (X, Y, Z) in the reference colorimetric system of an object that is placed in the field of observation of a video camera.

Thus, for example, it is possible to inspect, without making physical contact, articles such as receptacles or labels travelling at high speed on a manufacturing line, with inspection serving to detect any change in the color of said objects or any surface defects.

It can also be advantageous to use a display system to reproduce accurately the color of an object observed by the camera.

Advantageously, a color is simultaneously measured and accurately reproduced by the display system. Nevertheless, without going beyond the ambit of the invention, it is possible to perform one or the other.

When all that is required is to reproduce the color of an object accurately by means of the display system, there is no need to display to the user the tristimulus values of the color of the object in the reference colorimetric system as calculated by the central unit 5 in the manner described above.

Applying the output signals (R, G, B) from the converter 6 directly to the input of the display system would lead to unsatisfactory reproduction of the color of the object on the screen of the display device 4, in particular because of the non-linearities in the acquisition system and because of the non-linearities in the display system, and because of the differences between the colorimetric systems associated respectively with the acquisition system and with the display system.

A first improvement is provided by correcting the non-linearities of the acquisition system, as described above.

Nevertheless, the quality with which the color of the object is reproduced can be further improved when the non-linearities of the display system are also corrected.

This correction is performed in the central unit 5.

Figure 5:
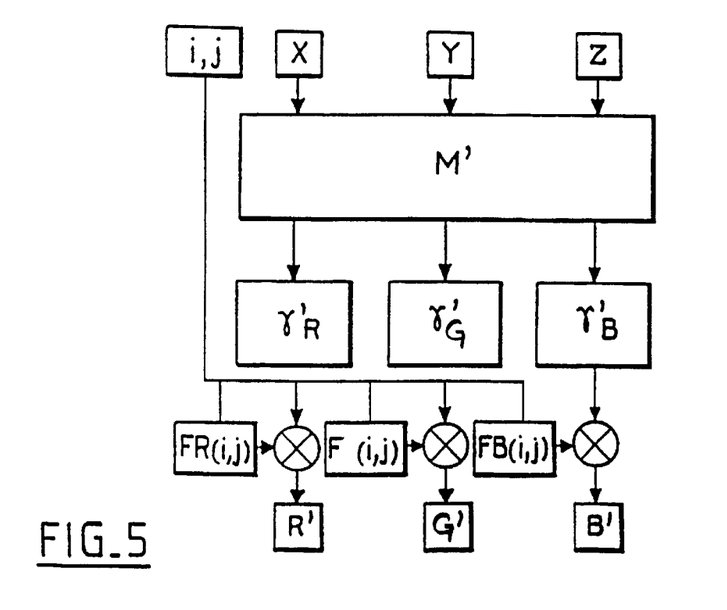
FIG. 5 is a model of the processing enabling corrected tristimulus values to be determined in the colorimetry system associated with the display system.

FIG. 5 shows a model of the processing for transforming tristimulus values (X, Y, Z) in the reference colorimetric system XYZ into tristimulus values (R', G', B') at the input to the display system. The process begins by transforming the previously determined tristimulus values (X, Y, Z) into tristimulus values in the colorimetric system associated with the display system by means of a transfer matrix M', and then each of the values obtained in this way has a correction function Y' applied thereto which is not related to position on the screen, which function has components $Y_R'$, $Y_G'$, and $Y_B'$, and then a function is applied for correcting non-uniformity of screen illumination FR(i,j), FG(i,j), and FB(i, j) which is associated with position on the screen.

Figure 6:
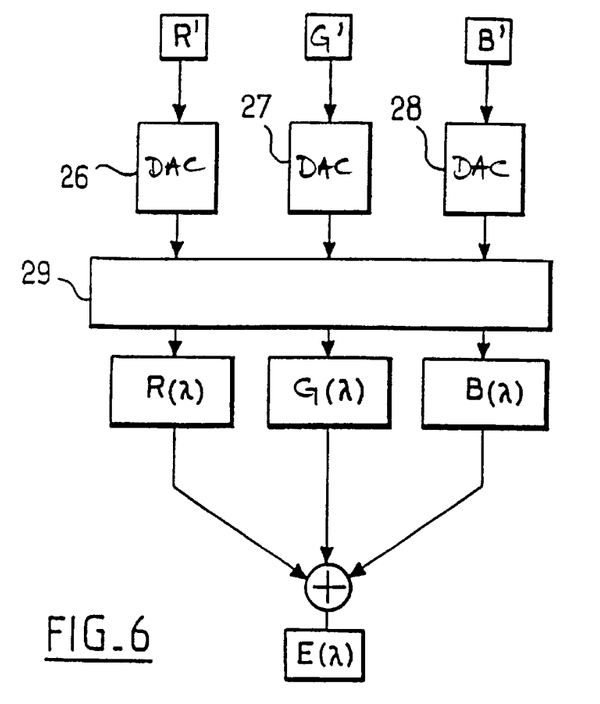
FIG. 6 is a model of the processing applied to the input signals in a CRT display device.

FIG. 6 shows a model of the processing applied to the digital signals (R', G', B') received by the display system which leads to an image being obtained on the screen of the display device.

The tristimulus values (R', G', B') for each image point are transformed into analog signals by means of a three-channel digital-to-analog converter 26, 27, and 28. The analog signals output from the converter are processed in conventional manner at 29 so that each of them controls a cathode beam for illuminating phosphorescent regions of the screen that respond to the incident electron flux by emitting light of a determined color. Summing the spectra R($\lambda$), G($\lambda$), and B($\lambda$) emitted by the phosphorescent regions, respectively producing the colors red, green, and blue, gives rise to a resultant spectrum E($\lambda$) for each image point.

This transfer matrix M' is calculated by knowing the tristimulus values ($X_{R'}$, $G_{R'}$, $Z_{R'}$), ($X_{G'}$, $Y_{G'}$, $Z_{G'}$) and ($X_{B'}$, $Y_{B'}$, $Z_{B'}$) in the reference colorimetric system XYZ of input colors corresponding respectively to the following triplets (255,0,0), (0,255,0), and (0,0,255) for each image point.

The transfer matrix M'has column vectors comprising the coordinates in the reference colorimetric system for the three primary colors under consideration.

$$M' = \begin{matrix} X_{R'}, & X_{G'}, & X, \\ Y_{R'}, & Y_{G'}, & Y, \\ Z_{R'}, & Z_{G'}, & Z, \end{matrix}$$

To calculate the components $Y'_R$, $Y'_G$, and $Y'_B$ of the correction function Y', and knowing the matrix M', it is possible to use a screen calorimeter to measure the light emitted at the center of the image as a function of successive and different input triplet values (R', G', B').

It is also possible to determine the components $Y'_R$, $Y'_G$, and $Y'_B$ without screen color measurement, as follows.

Account is taken of the fact that the luminance W from each screen point is associated with the voltage V controlling the electron beam reaching it by the following approximate formula:

$$\log(W/W_{max}) = k_1 + k_2 \log(V/V_{max}) + k_3 (\log(V/V_{max}))^2 + k_4 (\log(V/V_{max}))^3$$

Two ranges of input values R', G', or B' are then distinguished: [0,64] and [64,255].

In each range, the parameters $k_1$, $k_2$, $k_3$, and $k_4$ are determined by the luminance value when the input digital signal has the following values in succession: 0, 32, 64, 128 in the first range, and 32, 64, 128, 255 in the second.

By way of example, it is assumed that the procedure begins by seeking to determine the component $Y'_R$.

Figure 7:
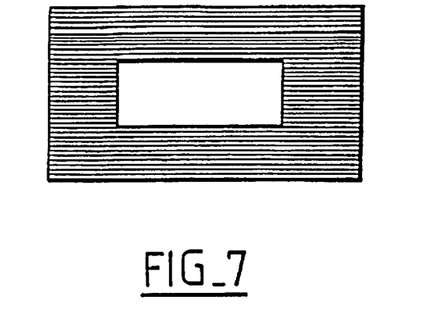
FIGS. 7 and 8 show two test patterns for calibrating the display system.

A test pattern of the kind shown in FIG. 7 is displayed on the screen which pattern comprises a central rectangle of red color corresponding to an input selection (128,0,0). The central rectangle is included in a rasterized rectangle where every other line is of a red color corresponding to an input of (255,0,0) and where every other line is of a black color corresponding to input values of (0,0,0).

Thereafter, and where appropriate, the input digital signal (R',0,0) controlling the luminance of the central rectangle is controlled until the luminance thereof appears to be equal to the luminance of the rasterized rectangle.

Thereafter, the correction is deduced that ought to have been applied to the input signal in order to obtain such equalization in the value of the function $Y'_R(128)$.

The procedure is then repeated by displaying a central rectangle of color (64,0,0) surrounded by a rasterized rectangle where every other line is of a red color corresponding to ($Y'_R(128),0,0$) and the intermediate lines being black in color, thereby making it possible to calculate $Y'_R(64)$, etc.

Thereafter, the values of the parameters $k_1$, $k_2$, $k_3$, and $k_4$ are determined and the missing values of $Y'_R$ are calculated from the preceding formula.

The same procedure is applied for calculating $Y'_G$ and $Y'_B$.

Non-uniformity in screen illumination is due mainly to the dispersion of the electron beam that strikes the screen.

In order to correct this non-uniformity, the luminance and various points of the screen is measured for each of the three channels: red, green, and blue.

For each of the red, green, or blue channels, correction factors are calculated to be applied to each point on the screen.

The correction factors for each of the red, green, and blue channels are written FR(i,j), FG(i,j), and FB(i,j) respectively.

It is assumed that the screen is calibrated in the center, so that it suffices to know the correction factors to be applied to each point of coordinates (i,j) on the surface of the screen away from the center in order to obtain a screen that is calibrated in full.

The illumination of the screen as a function of the coordinates (i,J) of a point away from the center and of the coordinates $i_{center}$, $j_{center}$ at the center of the screen varies approximately with the following function C(i,j):

$$C(i,j)=(((i-i_{center})^2+(j-j_{center})^2/r^2)*((1+(i-i_{center})^2)/r^2)^{1/2}*((1+(i-i_{center})^2)/r^2)^{1/2}$$

where r is the radius of curvature of the screen.

Figure 8:
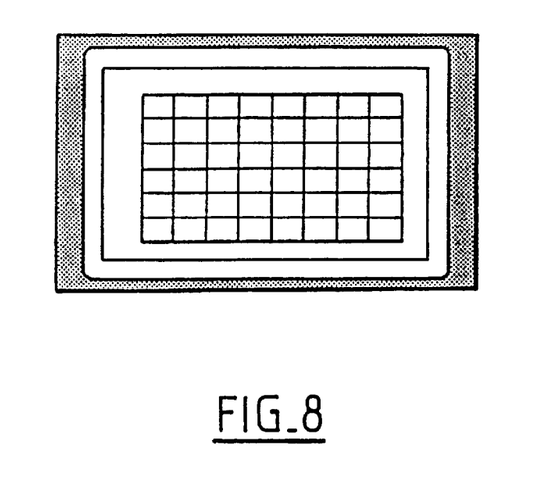

The luminance of each rectangle of a calibration grid of the kind shown in FIG. 8 is then measured by means of a screen colorimeter or by means of a spectrophotometer.

By comparing this luminance with the luminance at the center, it is possible to deduce a plurality of values for the function FR(i,j).

Given these values, it is then possible to calculate the missing values of the function FR(i,j) by interpolating using a 3rd degree polynomial function.

FG(i,j) and FB(i,j) are obtained in the same manner.

Also, a CRT behaves like a lowpass filter, and the value of the control signal applied to the electron beam reaching pixels on a given raster line depends on the value of the control signal for the preceding pixel on the same raster line.

Figure 9:
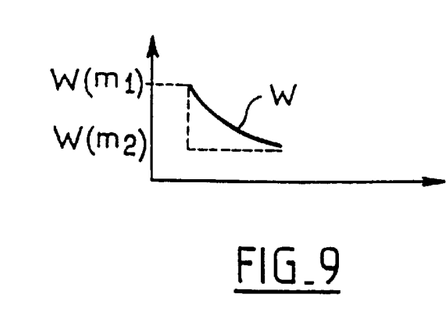
FIGS. 9 and 10 are diagrams showing how luminance variation in pixels on the same raster line varies as a function of variation in the control level applied to the pixels, respectively with and without anticipated correction for taking into account the rate at which the signal controlling the electron beam reaching the pixels varies when the control level varies.

By way of example, FIG. 9 shows how luminance variation for successive pixels situated on a given raster line itself varies as a function of variation in control level.

More precisely, the example shown relates to the case where the control level is $m_1$ for pixels situated at the beginning of the raster line and changes to $m_2$ for the following pixels, where the value $m_2$ is less than the value $m_1$.

It is observed that the luminance W of the pixels in response to control level $m_2$ does not drop suddenly form $W(m_1)$ to $W(m_2)$ but drops in substantially exponential manner.

In other words, if the pixel control level changes suddenly from the value $m_1$ to the value $m_2$, then the luminance does not switch immediately to the level $W(m_2)$.

It is then advantageous to correct the control level in anticipation of the rise or fall time for each of the red, green, and blue channels.

The correction is performed for each raster line in the scanning direction.

Figure 10:
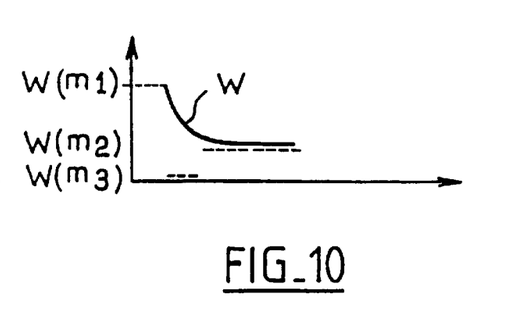

Assuming that it is desired in a given raster line to switch from a luminance $W(m_1)$ corresponding to a control level $m_1$ to a luminance $W(m_2)$ corresponding to a control level $m_2$, then the level of the pixel control signal is corrected by anticipation for the pixels that are to be activated so that said pixels reach the luminance level $W(m_2)$ more quickly.

Thus, the pixels are controlled using a control level $m_3$ that is lower than $m_2$ so as to cause luminance to fall off more quickly, as shown in FIG. 10.

This predictive correction to the control level does not appear in the model shown in FIG. 5, in order to clarify the drawing.

In order to determine the time constant that makes it possible to calculate the rise or fall time of the electron beam control signal, it is possible to proceed by displaying a first rectangle on the screen in a single color in which every other pixel of each raster line constituting the rectangle is controlled by means of different control levels.

A second rectangle having the same color and the same control level in all of its pixels is also displayed on the screen.

Thereafter, it is possible to deduce the value of the time constant from the values of the pixel control levels applied to the two rectangles displayed on the screen, and thus to deduce the correction that should be applied to the control levels for said pixels in order to perform the above-mentioned predictive correction. Finally, the invention makes it possible to measure the color of objects whether or not they are opaque, whether or not they are plane or in relief, whether or not they are moving or fixed, and it enables the measurement to be performed without coming into contact with the objects, with measurement being performed in transmission or in reflection, and more particularly the invention makes it possible to measure the color of skin and of hair.

In an advantageous embodiment, the invention further makes it possible to reproduce without excessive distortion the color of an object by means of a display device.

The invention also makes it possible to measure the color of each point of an object, even if the object is non-uniform in color.

Naturally, the invention is not limited to the embodiment described above and, in particular, it is possible to use other display devices, such as a printer or a liquid crystal screen.

What is claimed is:

1. Apparatus for measuring color, comprising:
   an acquisition system including a video camera, said acquisition system being suitable for delivering signals representative of the tristimulus values in a colorimetric system associated with said acquisition system for the color of an object placed in the observation field of the camera; and
   processor means organized to respond to said signals to determine the tristimulus values of the color of the object in a reference colorimetric system using a transfer matrix to transform from the colorimetric system associated with said acquisition system into the reference colorimetric system, and a correction function for correcting the non-linearities of said acquisition system, said transfer matrix and said correction function being calculated using an iterative process based on the known tristimulus values in the reference colorimetric system of three primary colors and of at least two gray levels and from their tristimulus values in the colorimetric system associated with said acquisition system, as obtained by using said video camera to observe said primary colors and said gray levels.

2. Apparatus according to claim 1, further including a display system for reproducing all or a portion of the image observed by said video camera after said signals delivered by the acquisition system have been processed by said correction function.

3. Apparatus according to claim 2, wherein said display system includes a CRT display device.

4. Apparatus according to claim 1, further comprising a light source for illuminating the object placed in the field of observation of the camera, said source having a continuous emission spectrum $I(\lambda)$ selected so as to be close to a reference illuminant of spectrum $D(\lambda)$.

5. Apparatus according to claim 4, in which the camera includes a set of optical filters of spectra $FR(\lambda)$, $FG(\lambda)$, and $FB(\lambda)$ to resolve the image observed by the camera into primary color images on the sensors of said camera, wherein the source is filtered by one or more filters for which the resultant filter function $F(\lambda)$ is selected so as to minimize the error of differences between the products $D(\lambda)\cdot x(\lambda)$, $D(\lambda)\cdot y(\lambda)$, and $D(\lambda)\cdot z(\lambda)$, and a linear combination of the products:
   $F(\lambda)\cdot I(\lambda)\cdot FR(\lambda)$, $F(\lambda)I(\lambda)\cdot FG(\lambda)$, and $F(\lambda)\cdot I(\lambda)\cdot FB(\lambda)$
   where $x(\lambda)$, $y(\lambda)$, and $z(\lambda)$ are the spectral tristimulus values in the reference colorimetric system.

6. Apparatus according to claim 5, wherein said reference illuminant is the CIE illuminant of spectral $D_{65}(\lambda)$.

7. A method of measuring color from an acquisition system including a video camera suitable for delivering signals representative of the tristimulus values, in a colorimetric system associated with the said acquisition system, of the color of an object placed in the field of observation of the camera, the method comprising the steps consisting in:

successively or simultaneously placing in the field of observation of the camera three primary colors and at least two gray levels, the tristimulus values of said primary colors and of said gray levels being known in a reference colorimetric system;

using an iterative process based on said tristimulus values in said reference colorimetric system and the corresponding tristimulus values in the colorimetric system associated with said acquisition system as obtained by observing said primary colors and said gray levels using said camera to calculate a transfer matrix for transforming from the colorimetric system associated with said acquisition system into the reference colorimetric system, and also a correction function for correcting the non-linearities of said acquisition system; and     determining the tristimulus values in the reference colorimetric system of the color of an object placed in the field of observation of the camera by using said transfer matrix and said correction function as calculated.

8. A method according to claim 7, further comprising the step consisting in using a display system to display the color of the object after non-linearities in the acquisition system have been corrected.

9. A method according to claim 8, wherein non-linearities in the display system are also corrected.

10. A method according to claim 8, wherein the display system includes a CRT display device.

11. A method according to claim 10, wherein, at a control level transition for pixels in the same raster line giving rise to a change in luminance between at least one pixel in said raster line and the pixel immediately following it in the raster scanning direction, the control level for said immediately following pixel is selected as a function of the rate at which the control signal for the electron beam reaching pixels situated on the same raster line varies when the pixel control level varies.

12. A method according to claim 9, wherein a correction function for correcting the non-linearities of the display system is determined by: displaying two zones having the same color but having luminances that may be different, the color of one of the zones being obtained by juxtaposing pixels having different control levels, and the color of the other zone being obtained by a set of pixels having the same control level; making the luminances of the two zones equal for an observer by acting on the pixel control levels in one of the zones; and deducing from the pixel control levels of each of said zones information for calculating said correction function for correcting the non-linearities of the system.

13. A method according to claim 12, wherein the zone made up of pixels having different control levels is rasterized.

14. A method according to claim 13, wherein said rasterized zone has every other raster line black.

15. A method according to claim 12, wherein the zone made up of pixels having different control levels comprises alternating pixels in each raster line having a control level that differs from the control level of the preceding pixel.

16. A method according to claim 7, wherein said iterative process comprises the following steps:

calculating an approximate transfer matrix on the basis of the known tristimulus values of said primary colors and of said gray levels, and on the basis of an approximate correction function;

calculating a new approximate correction function using the approximate transfer matrix calculated in this way and the known tristimulus values of said gray levels, and by interpolating the missing values; and     recalculating the approximate transfer matrix and the approximate correction function until a fixed convergence threshold is reached.

17. A method according to claim 7, wherein said iterative process comprises the following steps:

calculating an approximate correction function on the basis of the known tristimulus values of said primary colors and of said gray levels, and on the basis of an approximate transfer matrix;

calculating a new approximate transfer matrix using the known tristimulus values of said grays and interpolating the missing values; and     recalculating the approximate correction function and the approximate transfer matrix until a fixed convergence threshold is reached.

18. A method according to claim 7, wherein non-uniformities in the illumination of the object by the source is also corrected, as are optical aberrations of the camera, by measuring the luminance of the screen at various points and by comparing it with the luminance at a reference point.

\* \* \* \* \*